(12) United States Patent
Chuang

(10) Patent No.: US 10,638,576 B1
(45) Date of Patent: Apr. 28, 2020

(54) CONTROL CIRCUIT OF LAMP

(71) Applicant: Yung Huang Chuang, Taipei (TW)

(72) Inventor: Yung Huang Chuang, Taipei (TW)

( * ) Notice: Subject to any disclaimer, the term of this patent is extended or adjusted under 35 U.S.C. 154(b) by 0 days.

(21) Appl. No.: 16/578,576

(22) Filed: Sep. 23, 2019

(51) Int. Cl.
| H05B 37/02 | (2006.01) |
| H05B 45/10 | (2020.01) |
| H05B 47/11 | (2020.01) |
| H05B 47/19 | (2020.01) |

(52) U.S. Cl.
CPC ............ H05B 45/10 (2020.01); H05B 47/11 (2020.01); H05B 47/19 (2020.01)

(58) Field of Classification Search
CPC ............ H05B 37/0218; H05B 37/0227; H05B 37/0272
USPC .................................... 315/152, 307
See application file for complete search history.

(56) References Cited

U.S. PATENT DOCUMENTS

| 2010/0039792 A1* | 2/2010 | Meyers .................. F21L 2/00 362/20 |
| 2012/0268015 A1* | 10/2012 | Sun ....................... H05B 45/20 315/136 |
| 2013/0063045 A1* | 3/2013 | Ishikita ................. H05B 45/20 315/296 |
| 2014/0265919 A1* | 9/2014 | Pope ..................... H05B 33/0842 315/294 |
| 2018/0263096 A1* | 9/2018 | Deixler ............... H05B 37/0272 |

* cited by examiner

*Primary Examiner* — Tung X Le
(74) *Attorney, Agent, or Firm* — Muncy, Geissler, Olds & Lowe, P.C.

(57) ABSTRACT

A control circuit of a lamp has a mode switch, an ambient brightness detector, a human-body movement detector, an illumination device, a wireless communication module, and a microcontroller. The mode switch provides a mode code. The ambient brightness detector outputs an enable signal when brightness of ambient environment is darker than a threshold. The human-body movement detector outputs a trigger signal when detecting a movement event within a detecting area. When the microcontroller receives the enable signal and the trigger signal, the microcontroller activates the illumination device and outputs a wireless control signal having the mode code via the wireless communication module. When the microcontroller receives another wireless control signal via the wireless communication module and determinates that a control code of said another wireless control signal is consistent with the mode code, the microcontroller activates the illumination device.

12 Claims, 6 Drawing Sheets

US 10,638,576 B1

CONTROL CIRCUIT OF LAMP

BACKGROUND OF THE INVENTION

1. Field of the Invention

The present invention relates generally to a control circuit, and more particularly to a control circuit of a lamp.

2. Description of Related Art

A lamp, such as a wall lamp, is a utility apparatus adapted to be mounted on a wall for lightening a path. A traditional wall lamp may be electrically connected to a switch mounted on the wall, and the traditional wall lamp is passively turned on or off in accordance with the operation of the switch by a user. For example, the traditional wall lamp may be mounted on a wall of a corridor. Before a user walks through the corridor that may be dark and the user's view gets dim, the user has to manually operate the switch on the wall for the purpose of turning on the wall lamp. As a result, the wall lamp may lighten the corridor and the user has a better view to walk through the corridor. The user may have lower probability to fall down or collide with something by accident.

There would be a family that has an elderly person among them, or even there might be elderly persons living alone. The elderly person has to walk through the corridor or climb up/down the stairs alone. For example, at night, the elderly person may leave the bedroom to go to the toilet or climb up/down the stairs to get something. After leaving the bedroom, the elderly person has to find the switch of the wall lamp at first. However, the corridor is dark and the elderly person's eyesight is bad, such that it is quite inconvenient for the elderly person to find the switch and manually operate it in the dark.

SUMMARY OF THE INVENTION

An objective of the present invention is to provide a control circuit of a lamp for automatic illumination to overcome the disadvantage of the traditional lamp that is turned on/off by the manual operation of the switch.

The control circuit of the present invention comprises a mode switch, an ambient brightness detector, a human-body movement detector, an illumination device, a wireless communication module, and a microcontroller. The mode switch provides a mode code. The ambient brightness detector outputs an enable signal when brightness of ambient environment is darker than a threshold. The human-body movement detector outputs a trigger signal when detecting a movement event within a detecting area. The microcontroller is electrically connected to the mode switch, the ambient brightness detector, the human-body movement detector, the illumination device, and the wireless communication module. When the microcontroller receives the enable signal and the trigger signal, the microcontroller activates the illumination device and outputs a wireless control signal having the mode code via the wireless communication module. When the microcontroller receives another wireless control signal via the wireless communication module and determinates that a control code of said another wireless control signal is consistent with the mode code, the microcontroller activates the illumination device.

The control circuit is adapted to be installed in a lamp fixture of a lamp. For example, one or more than one lamp may be mounted on the wall or the handrail along a path that people may pass through for lightening the corridor, the stairway, the handrail, and so on for the purpose of providing better view for the people. When the brightness of the ambient environment is dark, the ambient brightness detector outputs the enable signal. Meanwhile, a person enters the detecting area, and the human-body movement detector outputs the trigger signal. As a result, the microcontroller automatically activates the illumination device according to the enable signal and the trigger signal.

Besides, two or more than two control circuits of the present invention may be mounted on the wall as an example. One of the control circuits may receive the wireless control signal from another control circuit to activate its illumination device. Hence, the control circuit of the present invention has auto-activating function and wireless-remote control function. The activated lamp lightens the path for providing better view to the people.

Compared with the traditional lamp, the lamp with the control circuit of the present invention is automatically turned on or off rather than manually operated. The lamp automatically illuminates before the elderly people, busy people, or people with disabilities pass the path. After they pass the path, the microcontroller does not receive the trigger signal or the wireless control signal and automatically turns off the illumination device. The user would not manually turn off the lamp. Therefore, the disadvantage of the traditional lamp as mentioned above is overcome.

DETAILED DESCRIPTION OF PREFERRED EMBODIMENT(S)

Figure 1:
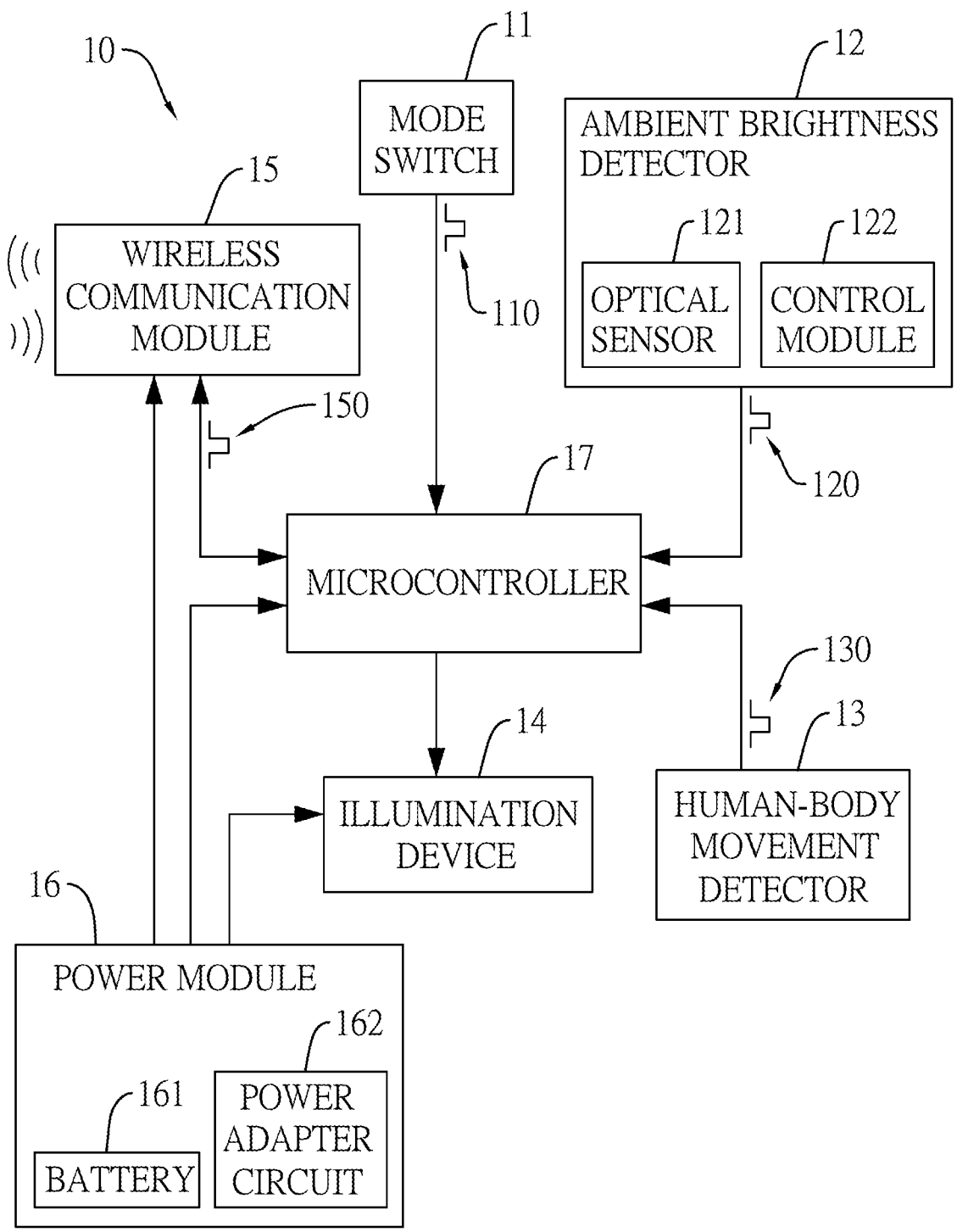
FIG. 1 is a block diagram of an embodiment of the control circuit of the present invention.

With reference to FIG. 1, the control circuit 10 of a lamp of an embodiment of the present invention comprises a mode switch 11, an ambient brightness detector 12, a human-body movement detector 13, an illumination device 14, a wireless communication module 15, a power module 16, and a microcontroller (MCU) 17. The control circuit 10 of the present invention is applied to be installed in a lamp fixture of the lamp. The lamp is mounted on a wall or the handrail for the purpose of illumination.

The mode switch 11 provides a mode code 110 according to a user's operation. For example, the mode switch 11 may be a dip switch. The mode code 110 may be a binary code, such as in the format of "0001" or "0011".

The ambient brightness detector 12 detects brightness of ambient environment. When the brightness of ambient environment is darker than a threshold, the ambient brightness detector 12 outputs an enable signal 120. The ambient brightness detector 12 essentially has an optical sensor 121 and a control module 122. The optical sensor 121 senses the brightness of ambient environment and accordingly outputs a brightness sensing signal. The brightness sensing signal may be a voltage signal or a current signal for reflecting the present brightness of ambient environment. For example, lower brightness sensing signal reflects darker ambient brightness. The control module 122 has an input terminal electrically connected to the optical sensor 121 to receive the brightness sensing signal. The control module 122 has a threshold value. When the control module 122 determines that the brightness sensing signal is lower than the threshold value, voltage level of an output terminal of the control module 122 is changed to a high voltage level from a low voltage level or changed to a low voltage level from a high voltage level. The change of voltage level on the output terminal of the control module 122 is the enable signal 120.

When the human-body movement detector 13 detects a movement event within a detecting area of the human-body movement detector 13, the human-body movement detector 13 outputs a trigger signal 130. In an embodiment of the present invention, the human-body movement detector 13 may be a passive infrared (PIR) detector. The human-body movement detector 13 has an output terminal. When no person enters the detecting area, the human-body movement detector 13 just detects an ambient temperature, such as the room temperature. As a result, there is no movement event and the voltage level on the output terminal of the human-body movement detector 13 may be low. When a person enters the detecting area, the human-body movement detector 13 may detect a higher temperature than the ambient temperature (human body temperature is higher than the room temperature). Hence, the human-body movement detector 13 determines the movement event occurs and then the voltage level of the output terminal of the human-body movement detector 13 is changed to a high voltage level. The change of voltage level on the output terminal of the human-body movement detector 13 is the trigger signal 130.

The illumination device 14 is a lighting device that provides lightening brightness or state indication. In an embodiment of the present invention, the illumination device 14 may comprise light emitting diodes (LED) and a driving circuit electrically connected to the light emitting diodes.

The wireless communication module 15 transmits and receives a wireless control signal 150. The wireless communication module 15 may be a short-range communication module. For example, the short-range communication module is operated based on IEEE 802.15.1 protocol (Bluetooth), IEEE 802.15.4 protocol (Zigbee), or Z-wave protocol.

The power module 16 is electrically connected to the illumination device 14, the wireless communication module 15, and the microcontroller 17 to provide working powers. In an embodiment of the present invention, the power module 16 comprises a battery 161 and a power adapter circuit 162. An input terminal of the power adapter circuit 162 is electrically connected to the battery 161. Multiple output terminals of the power adapter circuit 162 are electrically and respectively connected to the illumination device 14, the wireless communication module 15, and the microcontroller 17. The power adapter circuit 162 transforms the power of the battery 161 to direct-current (DC) working powers for outputting to the illumination device 14, the wireless communication module 15, and the microcontroller 17.

Figure 2:
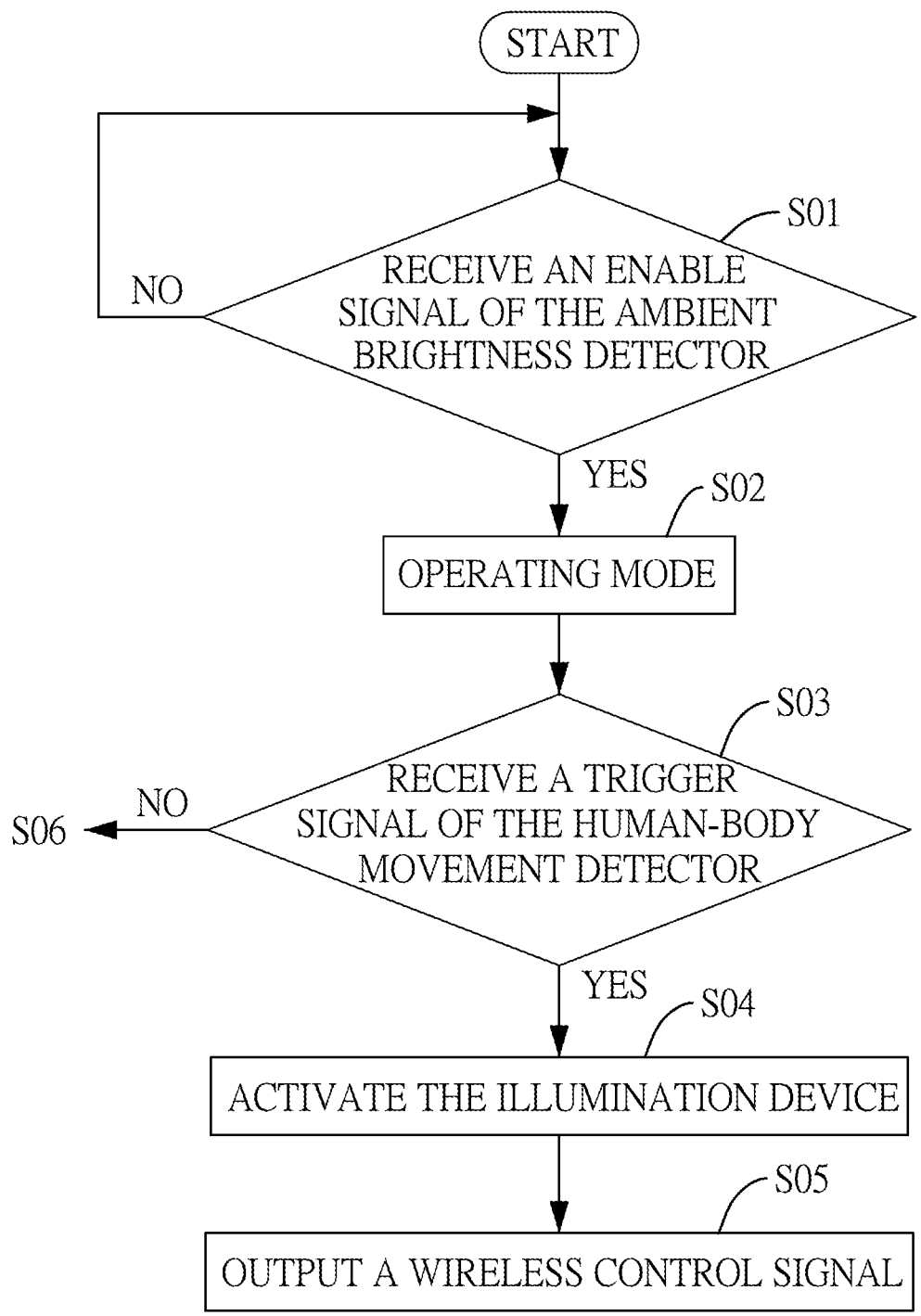
FIG. 2 is a flow chart performed by the control circuit of the present invention.

The microcontroller 17 is electrically connected to the mode switch 11, the ambient brightness detector 12, the human-body movement detector 13, the illumination device 14, the wireless communication module 15, and the power module 16. With reference to FIG. 2, at first, the microcontroller 17 determines whether the enable signal 120 of the ambient brightness detector 12 is received or not (STEP S01). When the microcontroller 17 does not receive the enable signal 120, which means the brightness of ambient environment is enough and the user's view is good, the microcontroller 17 is operated in a standby mode and does not activate the illumination device 14. When the microcontroller 17 receives the enable signal 120, which means the brightness of ambient environment is darker and the user's view becomes worse, the microcontroller 17 disables the standby mode and then switches to an operating mode (STEP S02). In the operating mode, the microcontroller 17 determines that the trigger signal 130 of the human-body movement detector 13 is received or not (STEP S03).

When the microcontroller 17 receives the trigger signal 130, the microcontroller 17 outputs a driving signal to the driving circuit of the illumination device 14 to activate the light emitting diodes of the illumination device 14 (STEP S04) for providing people passing through the lamp with illumination. Besides, the microcontroller 17 also outputs a wireless control signal 150 via the wireless communication module 15. The wireless control signal 150 has a control code. The control code is the mode code 110 received from the mode switch 11.

Figure 3:
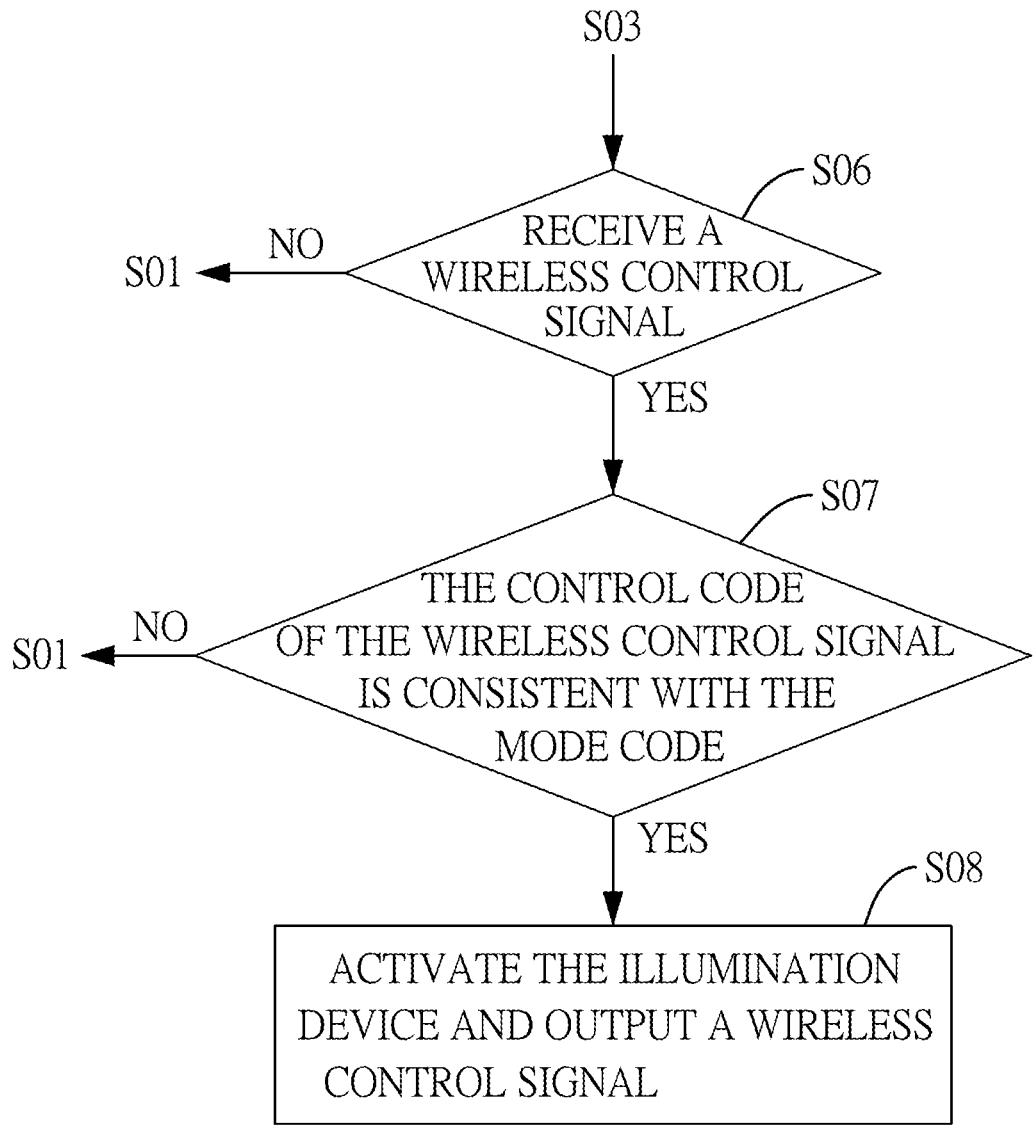
FIG. 3 is a flow chart performed by the control circuit of the present invention.

In STEP S03, when the microcontroller 17 does not receive the trigger signal 130, the microcontroller 17 does not activate the illumination device 14. With reference to FIG. 3, the microcontroller 17 further determines that another wireless control signal 150 is received via the wireless communication module 15 (STEP S06). In STEP S06, when the microcontroller 17 receives said another wireless control signal 150, the microcontroller 17 determines whether a control code of said another wireless control signal 150 is consistent with the mode code 110 of the mode switch 11 (STEP S07). When the control code of said another wireless control signal 150 is consistent with the mode code 110, the microcontroller 17 outputs a driving signal to the driving circuit of the illumination device 14 to activate the light emitting diodes of the illumination device 14. Besides, the microcontroller 17 also outputs a wireless control signal 150 with a control code consistent with its mode code 110 via the wireless communication module 15 (STEP S08). In STEP S07, when the microcontroller 17 determines that the control code of said another wireless control signal 150 is inconsistent with the mode code 110, the microcontroller 17 does not activate the illumination device 14.

In the above descriptions, STEP S03 is performed before STEP S06. In another embodiment of the present invention, STEP S06 may be performed before STEP S03.

The control circuit of the present invention may actively activate or deactivate the illumination device 14 according to the detection results of the brightness of ambient environment and the human-body movement. In addition, the control circuit of the present invention has wireless and remote control functions. Examples of the applications of the present invention are provided below.

Figure 4:
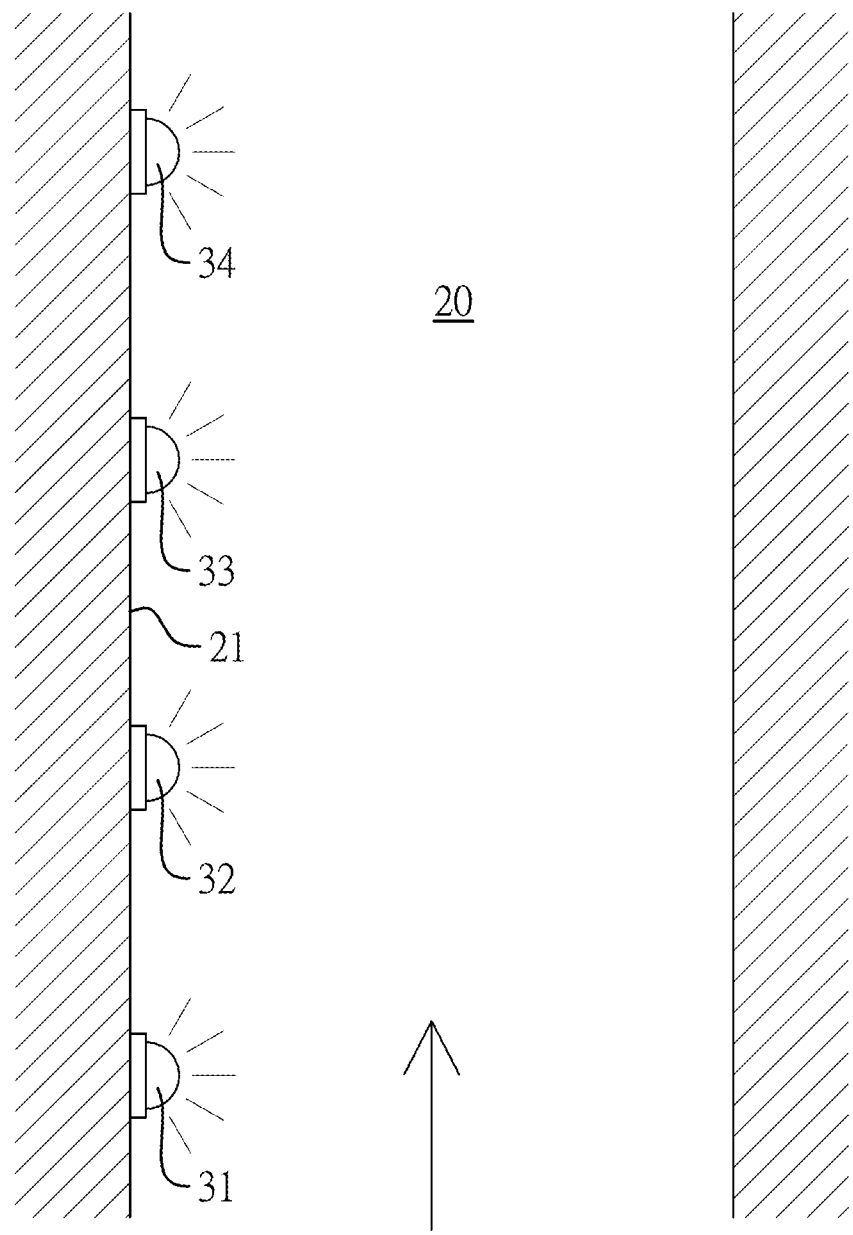
FIG. 4 is a schematic view of an application example of the control circuit of the present invention.

FIG. 4 is a schematic top view of a straight corridor 20. The arrow symbol represents a forward direction of a moving person. A first lamp 31, a second lamp 32, a third lamp 33, and a fourth lamp 34 are mounted on a wall 21 along the straight corridor 20. Each one of the lamps 31-34 has the control circuit 10 of the present invention as shown in FIG. 1. The mode switches 11 of the control circuits 10 of the lamps 31-34 provide same mode codes 110. In each two adjacent lamps, communication ranges of their wireless communication modules 15 cover each other. The microcontrollers 17 may be in the operating mode.

When the person enters the detecting area of the human-body movement detector 13 of the first lamp 31 (not entering the detecting area of the second lamp 32), the first lamp 31 is turned on by STEPs S03 and S04, the control circuit 10 of the first lamp 31 outputs the wireless control signal 150 by STEP S05, and the rest of the lamps 32-34 are remotely and wirelessly turned on by STEPs S06-S08 Similarly, when the person enters the detecting area of the second lamp 32, the second lamp 32 is turned on by STEPs S03 and S04, the control circuit 10 of the second lamp 32 outputs the wireless control signal 150 by STEP S05, and the rest of the lamps 31, 33-34 are remotely and wirelessly turned on by STEPs S06-S08. Hence, all of the lamps 31-34 would be automatically turned on when the person enters the detecting area of any one of the lamps 31-34.

Figure 5:
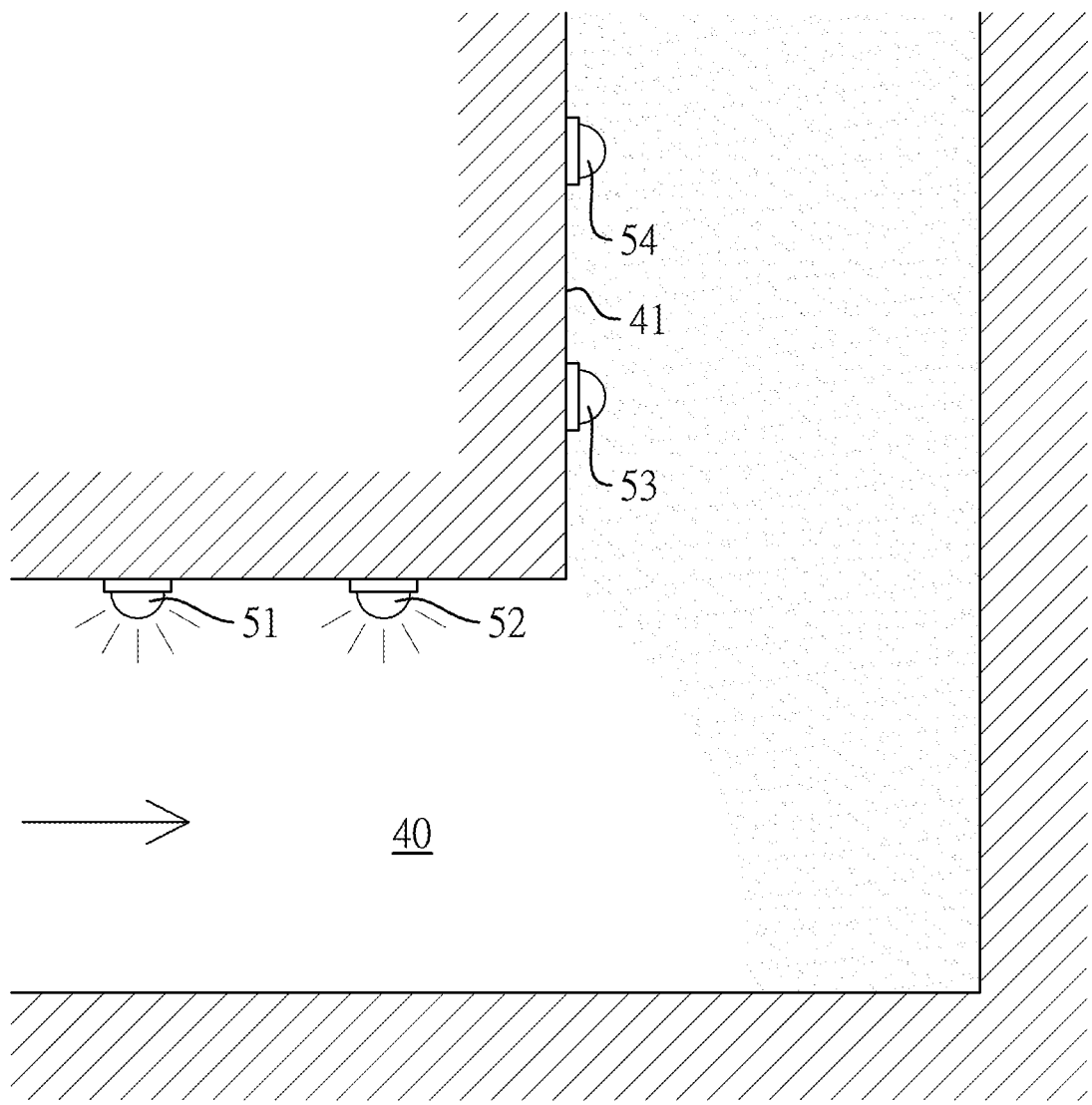
FIG. 5 is a schematic view of another application example of the control circuit of the present invention.

Another example of the application of the present invention is provided below. By setting the mode codes 110 of the mode switches 11 in different lamps, the lamps may provide different illuminating modes. FIG. 5 is a schematic top view of a corridor 40 with a corner. The arrow symbol represents a forward direction of a moving person. A first lamp 51, a second lamp 52, a third lamp 53, and a fourth lamp 54 are mounted on a wall 41 along the corridor 40. Each one of the lamps 51-54 has the control circuit 10 of the present invention as shown in FIG. 1. In each two adjacent lamps, communication ranges of their wireless communication modules 15 cover each other. Each one of the mode switches 11 of the first lamp 51 and the second lamp 52 provides a first mode code. Each one of the mode switches 11 of the third lamp 53 and the fourth lamp 54 provides a second mode code. The first mode code is distinct to the second mode code. The microcontrollers 17 may be in the operating mode.

When the person enters the detecting area of the first lamp 51, the first lamp 51 is turned on by STEPs S03 and S04, the control circuit 10 of the first lamp 51 outputs the wireless control signal 150 with the first mode code as the control code by STEP S05, and the second lamp 52 is turned on by STEPs S06-S08. Although the communication ranges of the second lamp 52 and the third lamp 53 cover each other, by STEP S07, the microcontroller 17 of the third lamp 53 may determine its second mode code is inconsistent with the control code (first control code) of the received wireless control signal, such that the third lamp 53 and the fourth lamp 54 are still turned off.

Figure 6:
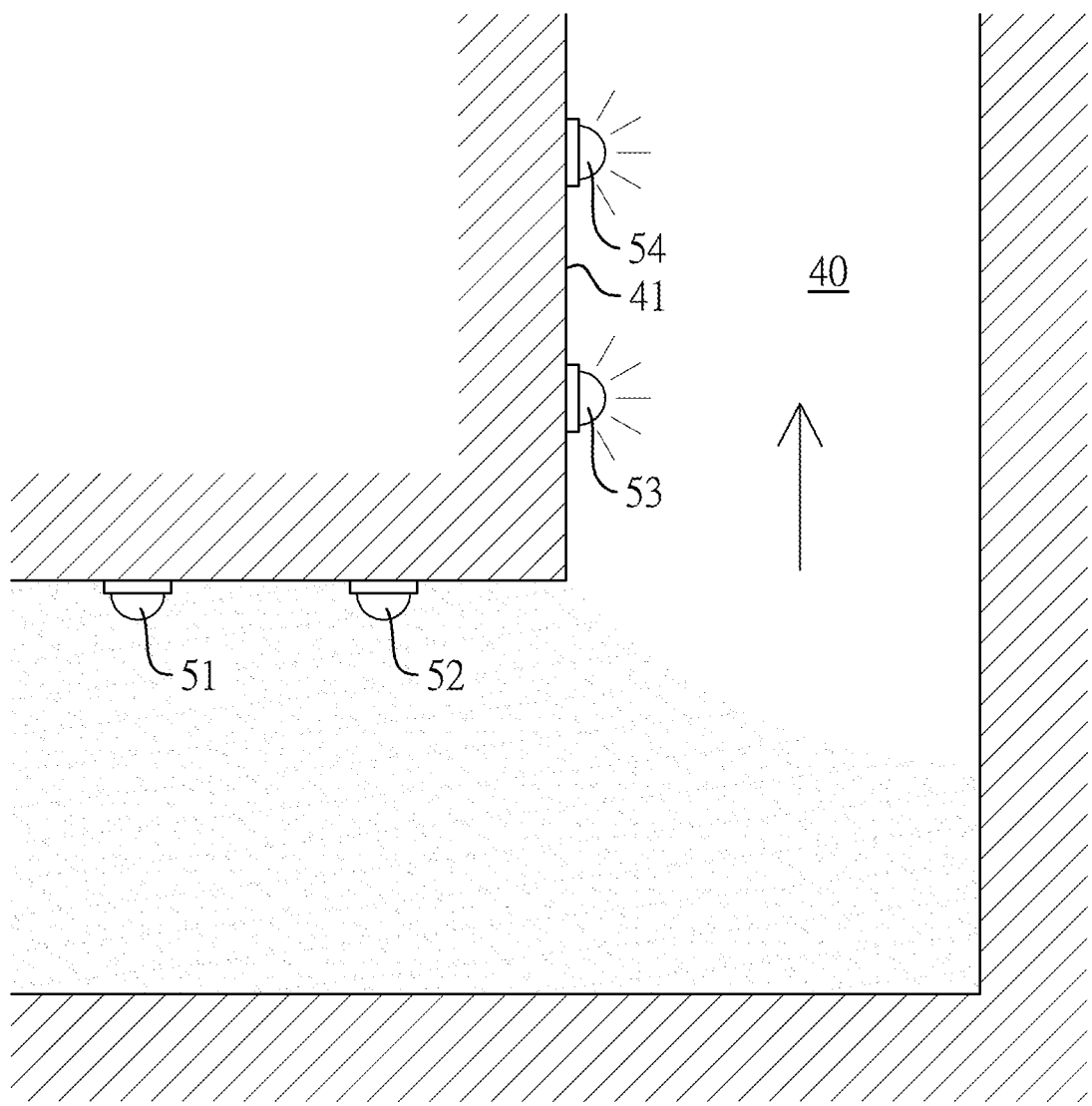
FIG. 6 is a schematic view of said another application example of the control circuit of the present invention.

With reference to FIG. 6, when the person enters the detecting area of the third lamp 53, the third lamp 53 is turned on by STEPs S03 and S04, the control circuit 10 of the third lamp 53 outputs the wireless control signal 150 with the second mode code as the control code by STEP S05, and the fourth lamp 54 is turned on by STEPs S06-S08. The microcontroller 17 of the second lamp 52 may determine its first mode code is inconsistent with the control code (second control code) of the received wireless control signal, such that the second lamp 52 and the first lamp 51 are turned off. On the other hand, the second lamp 52 and the first lamp 51 are automatically turned off. In this example, all of the lamps 51-54 are turned on in accordance with the person's positions rather than turned on all the time.

In conclusion, the control circuit of the present invention is provided to be installed in a lamp fixture of a lamp. The lamp may be mounted on the wall or the handrail for lightening the corridor, the stairway, the handrail, and so on for the purpose of providing better view for the user. The present invention automatically illuminates to improve the safety for the people walking at home. Especially for climbing up/down stairs, in order to lighten the user's path to avoid the user taking an infirm step on the stair, the illumination devices 14 of the control circuits 10 may be automatically activated at a same time via the wireless communication module 15 to receive and transmit the wireless control signals 150. Hence, the wireless communication module 15 and the human-body movement detector 13 are complementary to each other. The user may not manually turn on or off the light, such that it is very convenient especially for elderly people and people with disabilities. The present invention may be powered by the battery 161 of the power module 16 instead of being plugged in an outlet. As a result, the installation position of the present invention would not be limited by the position of the outlet or the length of the extension cord. Therefore, the position for installing the lamp with the control circuit of the present invention is more adaptable.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:
1. A control circuit of a lamp, comprising:
a mode switch providing a mode code;
an ambient brightness detector outputting an enable signal when brightness of an ambient environment is darker than a threshold;
a human-body movement detector outputting a trigger signal when detecting a movement event within a detecting area;
an illumination device;
a wireless communication module; and
a microcontroller electrically connected to the mode switch, the ambient brightness detector, the human-body movement detector, the illumination device, and the wireless communication module; wherein
when the microcontroller receives the enable signal and the trigger signal, the microcontroller activates the illumination device and outputs a wireless control signal having the mode code via the wireless communication module; and
when the microcontroller receives another wireless control signal via the wireless communication module and determinates that a control code of said another wireless control signal is consistent with the mode code, the microcontroller activates the illumination device;
the ambient brightness detector has an output terminal, and a change of voltage level on the output terminal of the ambient brightness detector is the enable signal; and
the human-body movement detector has an output terminal, and a change of voltage level on the output terminal of the human-body movement detector is the trigger signal.
2. The control circuit as claimed in claim 1 further comprising a power module, wherein the power module comprises
a battery; and
a power adapter circuit having
an input terminal electrically connected to the battery; and multiple output terminals electrically and respectively connected to the illumination device, the wireless communication module, and the microcontroller.

3. The control circuit as claimed in claim 2, wherein
the mode switch is a dip switch; and
the mode code is a binary code.

4. The control circuit as claimed in claim 2, wherein the human-body movement detector is a passive infrared detector.

5. The control circuit as claimed in claim 2, wherein the illumination device comprises light emitting diodes.

6. The control circuit as claimed in claim 2, wherein the wireless communication module is a short-range communication module.

7. The control circuit as claimed in claim 6, wherein the short-range communication module is operated based on IEEE 802.15.1 protocol.

8. The control circuit as claimed in claim 1, wherein
the mode switch is a dip switch; and
the mode code is a binary code.

9. The control circuit as claimed in claim 1, wherein the human-body movement detector is a passive infrared detector.

10. The control circuit as claimed in claim 1, wherein the illumination device comprises light emitting diodes.

11. The control circuit as claimed in claim 1, wherein the wireless communication module is a short-range communication module.

12. The control circuit as claimed in claim 11, wherein the short-range communication module is operated based on IEEE 802.15.1 protocol.

* * * * *